United States Patent Office 3,200,836
Patented Aug. 17, 1965

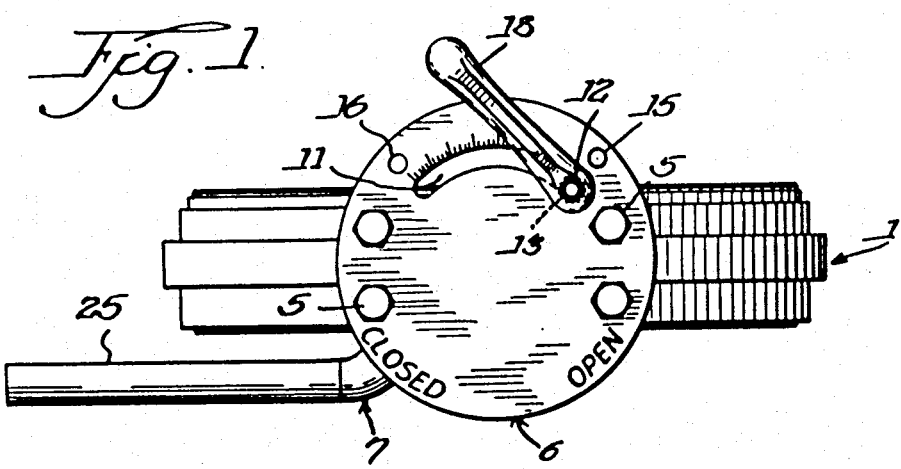
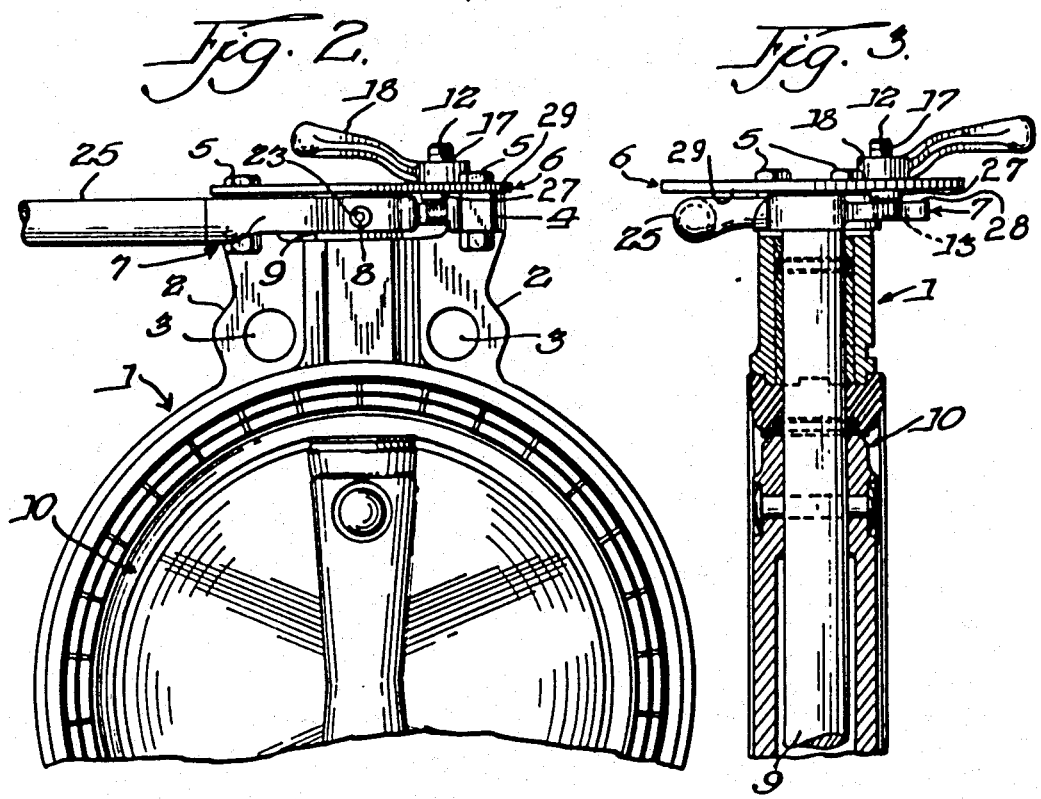
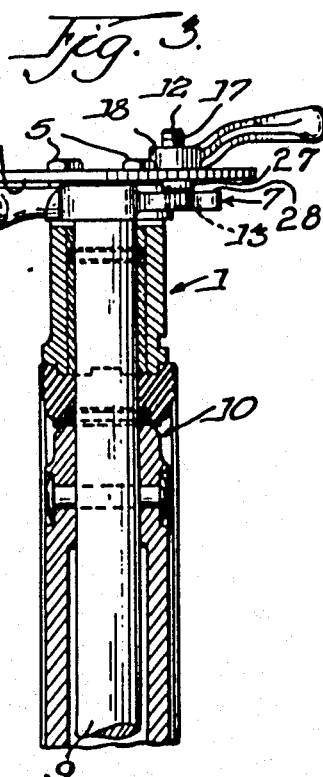

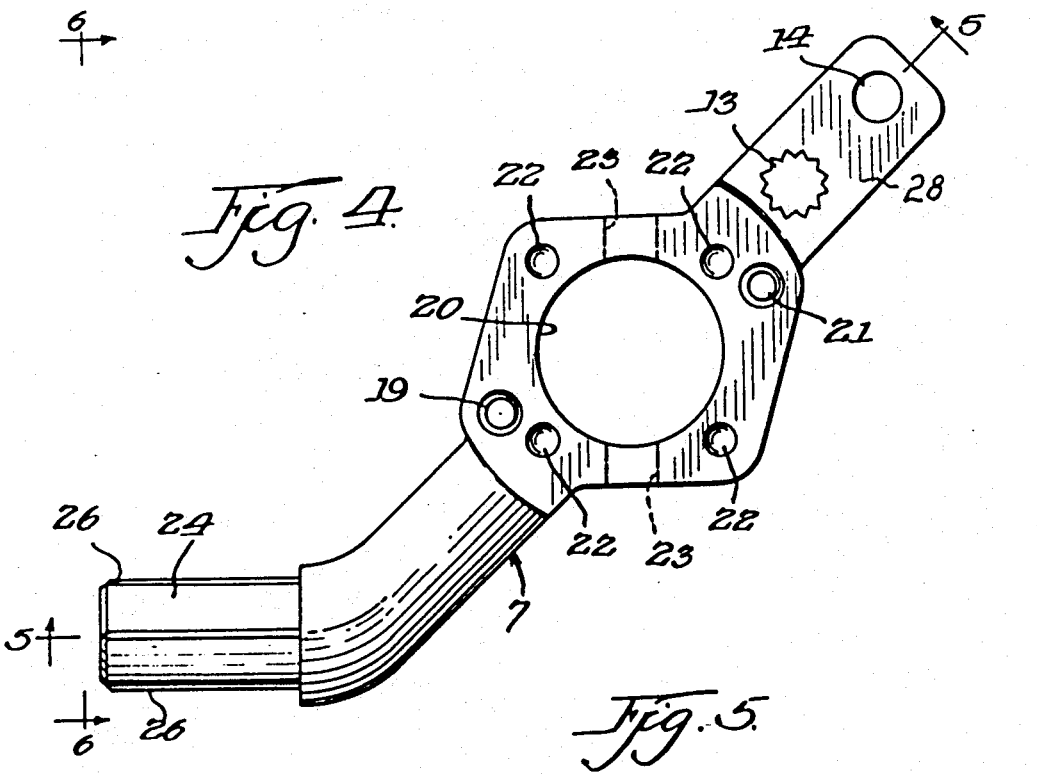
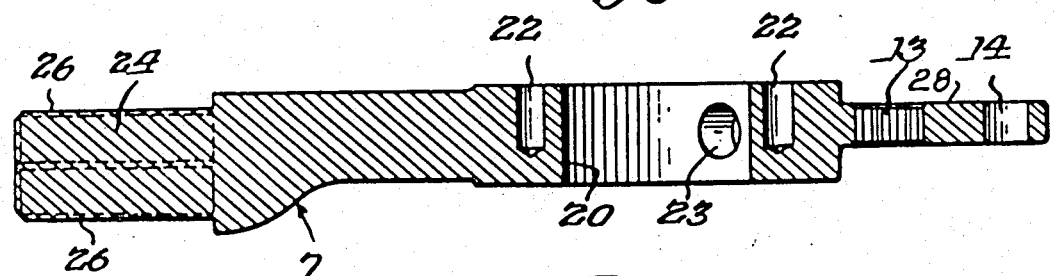
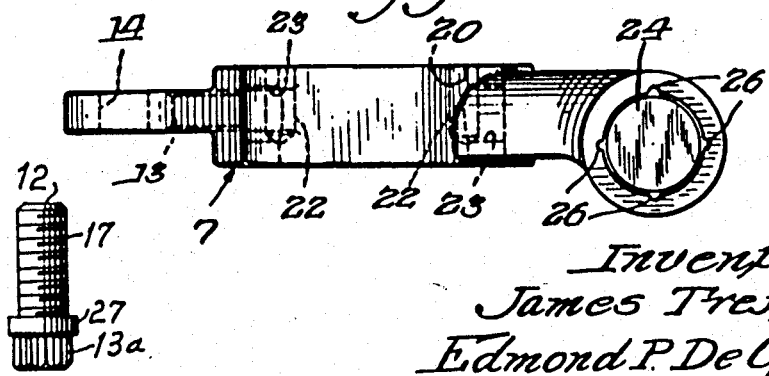

3,200,836
MULTI-LOCK LEVER AND COUPLING
James Trefil, Berwyn, and Edmond P. De Craene, Westchester, Ill., assignors to Crane Co., Chicago, Ill., a corporation of Illinois
Filed Sept. 26, 1963, Ser. No. 311,783
2 Claims. (Cl. 137—385)

This invention relates to a combined valve actuating and locking means, and, more particularly, it is concerned with a novel form of a multi-lock lever and coupling suitable particularly for use in connection with the operation of quarter turn valves such as butterfly valves, rotary valves, and the like.

Heretofore, in providing for the operation of butterfly valves, it has been a problem to not only operate the valve, but to retain the closure member, which is of a flat plate-like construction, in a desired rotative position between say full open and full closed positions of the valve. This makes it necessary that not only should such critical positioning of the valve be easily and positively accomplished, but it should also be capable of being secured in any one of a plurality of rotative positions, from open to full closed position, as well as to indicate clearly to the operator the position of the closure member in the intermediate positions of the valve.

Therefore, it is one of the more important objects to provide for a combined quarter turn valve actuating and locking means in which a multi-locking device is employed, capable of securing the valve closure against rotation in any position and permits the employment of a padlock in the full open or full closed position of the valve. In the intermediate valve position, the closure member may be conveniently secured and held frictionally by means of a threaded member as hereinafter described in detail.

Another important object is to provide for an actuating means in which the coupling employed therewith can be used either with a screw type actuating mechanism, such as that shown in patent application Serial No. 196,954, filed May 23, 1962, or it may also be used with cylinder operation, electric motor operation, or with the usual twist-lock lever.

Other objects and advantages will become more readily apparent upon proceeding with the following description read in light of the accompanying drawings, in which:

FIG. 1 is a plan exterior assembly view of the mechanism embodying this invention;

FIG. 2 is a fragmentary exterior view in end elevation of the construction shown in FIG. 1;

FIG. 3 is a fragmentary sectional assembly view in side elevation;

FIG. 4 is a plan exterior view of the multi-lock coupling employed embodying the invention;

FIG. 5 is a fragmentary sectional view taken on the line 5—5 of FIG. 4;

FIG. 6 is an end view of the structures referred to in FIGS. 4 and 5 viewed on the line 6—6 of FIG. 4; and FIG. 7 is a magnified exterior view of lock screw employed in this invention.

Similar reference numerals refer to similar parts throughout the several views.

Referring now to FIGS. 1 to 3 inclusive, the butterfly valve illustrated is of the kind normally referred to as a wafer-type, but is not necessarily restricted thereto. The details of the valve are shown more clearly in patent application Serial No. 177,402, filed March 5, 1962.

Now referring to FIG. 2, the support for the casing 1 is provided with the oppositely disposed lugs 2 suitably apertured for mounting between flanges on a pipe line (not shown), as at 3. At the upper limits of the lugs 2, the latter are thickened to provide for oppositely disposed integral brackets 4 to receive the through bolts 5 for attachment of the indicating plate 6. Before the attachment of the latter plate, however, the multi-lock coupling generally designated 7 is non-rotatably attached by means of the headless drive pin 8 to the rotatable valve stem 9, the details of which are shown in FIGS. 4, 5, and 6.

In connection with its functioning to rotatably effect the turning of the valve stem 9 and the closure member 10 of the valve integrally attached thereto, the coupling cooperates with the plate 6, the latter member being slotted as at 11 and being non-rotatably attached as previously mentioned to the brackets 4 as described. The slotted portion 11 of the plate 6 allows for the extension therethrough of the lock screw 12 received within the broached hole 13 of the coupling 7 as shown more clearly in FIGS. 4 and 5. The coupling is also provided with the end aperture 14, the slot 11 serving as the means for limiting the 90° rotative movement of the closure member 10 in opening the valve from fully open position to fully closed position or vice versa.

It will be noted in referring to the plan view of the plate 6 shown in FIG. 1 that the said plate is provided with the annularly spaced apart apertures 15 and 16 which in the wide open position of the valve or the fully closed position of the valve coincide respectively with the aperture 14 of the coupling 7 shown more clearly in FIGS. 4 and 5 whereby to permit the insertion of the usual hasp of a padlock, not shown, thereby locking the valve against tampering in both the fully open and closed positions. Thus in the valve open position, the hasp of the padlock will extend through the apertures 14 and 15 and in closed position the hasp will engage the respective apertures 14 and 16 of the coupling and plate.

The broached aperture 13 receives the suitably broached screw 12, which, as shown more clearly in FIG. 7, is broached, as at 13a, for effecting said reception. The latter member is threaded at its upper portion as indicated at 17 whereby to allow for the threaded locking lever 18 to be applied so that upon suitable rotation of the said locking lever, the latter member is drawn up snugly against the upper surface of the plate 6. This will frictionally lock the valve stem through the coupling in any desired position against vibration. Such objectionable condition is traceable to pipeline vibration or other causes as, for example, under certain flow conditions the valve might close in response to fluid flow through the valve.

Further, it should be understood that in order to avoid distorting the indicator plate 6 upon tightening the locking lever 18, an integral enlarged annular collar 27 is provided on the said screw 12 above its broached portion 13a. The collar 27 is preferably of a height sufficient to allow for sliding contacts with the upper surface 28 of the coupling 7 and with the undersurface 29 of the indicating plate 6, as shown more clearly in FIG. 3. Thus it will be apparent that by means of said collar 27, the threaded locking lever 18 can be used at any stage of rotation and tightened firmly without imposing any objectionable bending forces on the indicating plate 6.

It will be noted as more clearly shown in FIG. 4 that the coupling 7 is provided with the oppositely disposed tapped holes 19 and 21 for purpose of receiving cap screws for attachment of a conventional twist lever (not shown). In such case, use of the plate 6 may be dispensed with. In addition, it will be noted that the spaced apart holes 22 in the coupling 7 are provided for receiving suitable pins either to connect with hydraulic cylinder operators or screw-type operators. The coupling 7 is apertured as at 20 to receive the stem 9. The oppositely disposed transverse holes 23 receive the drive pin 8 as shown more clearly in FIG. 2. At an end portion of the coupling, and as shown more clearly in FIGS. 4 and 5, said coupling is formed as at 24 to receive a tubular extension 25 shown more clearly in FIGS. 1 and 2, the ribbing 26 engaging the interior of the tubing to hold the latter member against rotation when it is formed in assembling over the coupling end 24.

In summary, it will be appreciated that a compact, economical and effective means for not only expediting the actuation of a quarter turn valve has been accomplished, but also provides means for use of a cooperating plate therewithin in which the exact position of the secured valve closure member is indicated at all times and is locked in fully open and closed positions against objectionable tampering.

While only a single embodiment has been shown and described, it will be apparent that other modifications may be used falling within the spirit of the invention as defined by the appended claims.

We claim:

1. In a combined multi-lock coupling and valve actuating mechanism for a quarter turn valve, the combination of a multi-lock coupling adapted for non-rotatable attachment to a valve stem or the like, an apertured indicating and locking plate fixedly attached to the valve, the said plate being slotted for limiting the rotative movement of the valve and having other apertures for receiving the hasp of a padlock in full open and full closed positions of the valve, the said coupling having apertured means for cooperation with the padlock hasp and the lock apertures of said plate, the said coupling having a broached aperture and an opposite end disposed portion for manual gripping when operating the valve and projecting means thereon comprising a lock screw for cooperating with the slotted portion of said plate and securing said coupling against rotative movement in any position desired as determined by the length of the slotted portion of the said locking plate, the said lock screw having a broached lower end portion snugly engaging the said broached aperture of said coupling and having an upper threaded portion, a threaded locking lever mounted on the said upper threaded portion of said lock screw on said coupling and cooperating with said plate to secure said coupling against rotation at any desired position between the full open and full closed positions of the valve, the said lock screw having an enlarged annular collar between said lower broached portion of said lock screw and said upper threaded portion of said lock screw, the said collar portion when assembled being located between the uppermost surface of the coupling and the undersurface of the said plate and being of a height sufficient to allow for sliding contact between said surface of the coupling and the plate while supporting the adjoining portion of said plate against deformation when said locking lever is tightened.

2. The subject matter of claim 1, the said coupling having on an upper surface thereof means for attachment of power operated means or the like upon removal of said plate and said locking lever.

References Cited by the Examiner

UNITED STATES PATENTS

| 976,720 | 11/10 | Buttorff | 137—385 |
| 1,282,811 | 10/18 | Goldburg | 251—305 X |
| 1,621,738 | 3/27 | Motherwell et al. | 137—385 X |
| 2,979,076 | 4/61 | Kish | 137—385 X |

M. CARY NELSON, *Primary Examiner.*

HENRY T. KLINKSIEK, *Examiner.*